March 3, 1970 R. L. HANSEN 3,498,689
LAUNDRY CART
Filed June 18, 1968

INVENTOR.
ROGER L. HANSEN
BY Frederick E. Lange
ATTORNEY

United States Patent Office
3,498,689
Patented Mar. 3, 1970

3,498,689
LAUNDRY CART
Roger L. Hansen, 16501 N. Temple Drive,
Minnetonka Village, Minn. 55343
Filed June 18, 1968, Ser. No. 738,007
Int. Cl. B62b 3/02
U.S. Cl. 312—250                            7 Claims

ABSTRACT OF THE DISCLOSURE

A laundry cart designed for the handling of both soiled and clean laundry in which there are a plurality of side panels each of a width approximately one-half the width of a cart, the side panels being pivotally mounted to the frame of the truck adjacent their upper edges so that pairs of oppositely disposed side panels can be swung to a horizontal positon to form collectively shelves for the reception of clean laundry for transportation to the point of usage. One pair of opposite side panels may be removed for facilitating removal of dirty laundry.

BACKGROUND OF THE INVENTION

At the present time, it is conventional in connection with laundries in institutions, such as hospitals, to transport the soiled laundry to the laundry facilities, remove it from the container and launder it, return is under conditions in which the laundry is maintained clean, storing the clean linen until it is needed, and then transporting it to the various points of use in a cart containing a number of shelves. The present invention is concerned with eliminating certain of these steps and providing a single cart which can be used for handling both the soiled laundry and the clean linen. The cart, while not so limited, is particularly useful in connection with laundry facilities which are designed to serve a number of remote locations, such as separate hospitals or other buildings.

SUMMARY OF THE INVENTION

The present invention is concerned with a laundry cart having a plurality of side panels pivotally mounted to a central frame, pairs of opposite side panels being swingable to horizontal positions so that the pairs of opposed side panels each collectively form shelves. At least one pair of oppositely opposed side panels is preferably removable to facilitate the removal of the laundry. This is further facilitated by moving the upper pair of side panels to a horizontal positoin in which they constitute a top shelf.

Normally, each side panel has a width approximately one-half the width of the cart so that each side panel forms one half of a shelf when moved to horizontal position. Suitable detachable fastening means is preferably provided for holding the side panels against swinging movement when functioning as side panels.

The cart may be formed of materials which can be readily sterilized so that the cart, as a whole, can be sterilized for the reception of clean linen.

Further details and objects of the invention will be apparent from a consideration of the accompanying specification, claims and drawing.

DESCRIPTION OF THE PREFERRED EMBODIMENT

Figure 1:
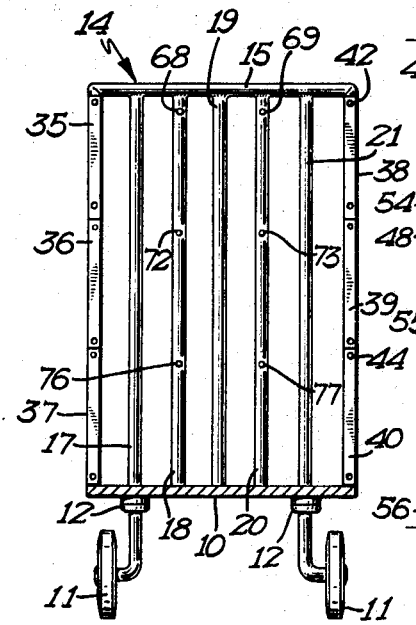
FIGURE 1 in the drawing shows an end sectional view of the cart, the section being taken along the line 1—1 of FIGURE 2.
Figure 2:
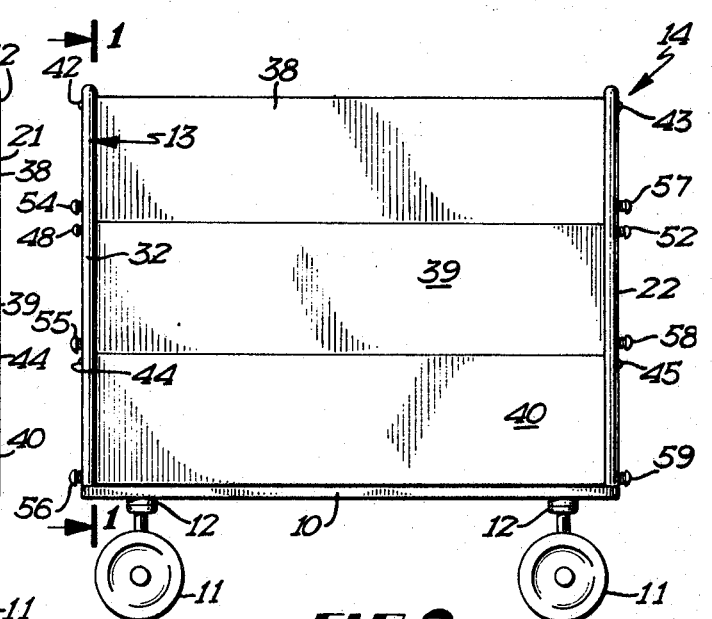
FIGURE 2 is a front elevational view of the cart.
Figure 3:
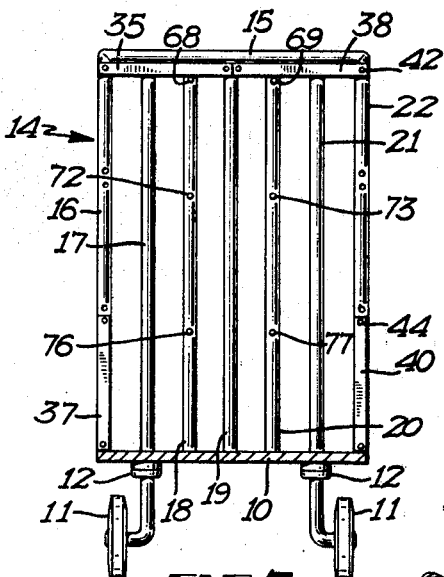
FIGURE 3 is a view similar to FIGURE 1 with two of the side panels removed and with the upper side panel moved to a horizontal position.

Referring to FIGURES 1 and 2, the cart is shown in the condition which it assumes when being used as a cart for the loading of soiled laundry. The cart preferably has a bottom plate 10 which is supported by a plurality of caster wheels 11 through suitable caster mountings 12. The specific nature of the caster mountings 12 and wheels 11 form no part of my invention. Secured to the base plate 10 at opposite ends are a plurality of end frame members 13 and 14. In FIGURE 1, the section is taken along the line 1—1 of FIGURE 2 so that the end frame member 13 is not visible in the drawing. The frame member 13 is, however, shown in FIGURE 4 and the frame member 14 is shown in FIGURES 1, 2 and 3. The two end frame members 13 and 14 are complementarily identical.

Referring to FIGURES 1 and 3, it will be noted that there is a horizontal bar 15 and a plurality of vertical bars 16, 17, 18, 19, 20, 21 and 22, bars 16 and 22 being visible only in FIGURE 3. The bars 16, 17, 18, 19, 20, 21 and 22 are rigidly secured at their lower ends to the base plate 10, as by welding. The horizontal bar 15 is rigidly secured to the upper ends of these vertical bars, as by welding. The bars may be of any suitable tubular stock of material which can be readily sterilized, such as stainless steel. The end panel 13 shown in FIGURE 14 is likewise formed of a horizontal bar or rod 25 and a plurality of vertical bars 26, 27, 28, 29, 30, 31 and 32, the bars 26 through 32 being rigidly fastened, as by welding, at their upper ends to the horizontal bar 25 and, at their lower ends, to the base plate 10.

The spacing of the various vertical bars is preferably sufficiently close to prevent escape of laundry from the cart but sufficiently far apart to permit ready entry of steam or other sterilizing medium into the interior of the cart.

Located on one side of the cart are a plurality of side panels 35, 36 and 37. Located on the other side of the cart are a plurality of side panels 38, 39 and 40. In FIGURE 1, the ends only of these panels are shown. In FIGURE 2, the panels 38, 39 and 40 are shown in elevation. It is to be understood that panels 35, 36 and 37 correspond to panels 38, 39 and 40. While panels 35 through 40 are shown as solid panels it is, of course, to be understood that these panels may be formed of spaced bars in a manner similar to the end frame members 13 and 14. Each of the panels 33 through 40 is hingedly secured adjacent its upper edge to the frame of the cart. Thus, referring to panel 38, a pivot pin 42 extends through the vertical bar 32 and into the panel 38 adjacent the upper edge thereof, the pin 42 being fixed with respect to bar 32 and pivotally engaging the panel 38 as by extending into a recess therein. On the opposite end of panel 38, a similar pin 43 extends through the vertical bar 22 into the opposite end of panel 38, pins 42 and 43 being disposed along a line parallel to and close to the upper edge of panel 38.

A similar arrangement is provided for supporting the lower panel 40. In this case, the opposite pins are designated by the reference numerals 44 and 45. Similar arrangements are provided for pivotally supporting panels 33 and 37 and it is believed unnecessary to described these in detail.

Figure 5:
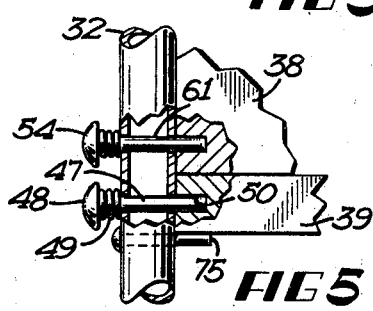
FIGURE 5 is a detail view of a portion of the cart showing portions of two side panels, one in vertical position and one in horizontal positon, and showing releasable retaining means for holding the side panels.
Figure 6:
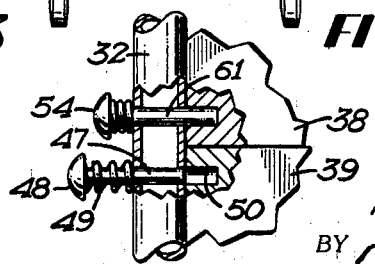
FIGURE 6 is a view similar to FIGURE 5 with both side panels in their vertical positons and with the retaining means of one released for removal of the side panel.

Panels 36 and 39 are supported so as to be entirely removable from the cart. Referring to FIGURES 5 and 6, which are fragmental views showing a portion of the bar 32 and portions of panels 38 and 39, it will be noted that the pivot pin for panel 39 consists of a spring biased pivot pin 47 having a knob 48 secured to the outer end thereof. A tension spring 49 is secured to knob 48 and to the bar 32 and acts to bias the pivot pin inwardly. The pivot pin 47 is designed to enter a cylindrical recess 50 near the upper edge of shelf 39. As shown in FIGURE 6, the pivot pin 47 can be retracted by pulling the knob 48 so as to move the pivot pin entirely within the bar 32, thus freeing the upper portion of panel 39. As best shown in FIGURE 2, a similar knob 52, secured to a pin not shown, is provided in the opposite end of panel 52. Thus by grasping knobs 48 to 52, the upper end of panel 39 can be released.

Figure 4:
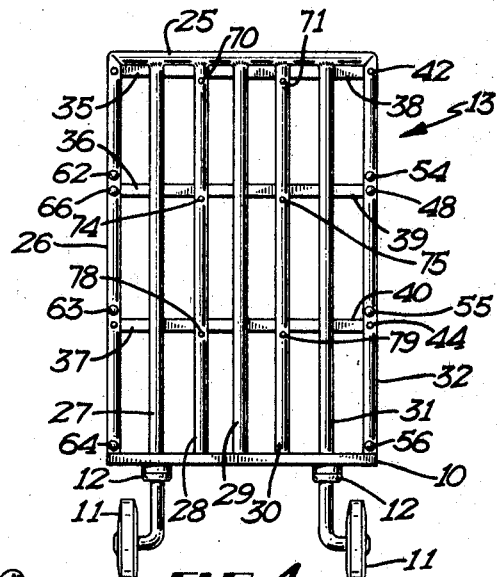
FIGURE 4 is an end elevational view showing all of the side panels in a horizontal position to act as shelves.

Associated with the lower portions of each of panels 38 through 40 are similar retractable pins having actuating knobs 54, 55, 56, 57, 58 and 59. As will be noted from FIGURES 5 and 6, the construction of these pins is the same as that of retractable pin 47, the pin comprising, in addition to knob 54, a pin 61 which is normally biased into a recess in the panel 38. Similar retractable pins are provided adjacent the lower edges of panels 35 through 37, the knobs for these pins on one end of panels 35 through 37 being shown in FIGURE 4 and designated by the reference numerals 62, 63 and 64. Similar retractable pins, not visible in the drawing, are associated with the opposite end of the panels. The function of the pins 54 through 59, 62, 63 and 64 is to prevent the panels 35 through 40 from swinging outwardly when the panels are in the position shown in FIGURES 1 and 2 and laundry is being placed in the cart. These pins must be retractable in order to permit turning the panels to their horizontal position as will be presently described. When it is desired to remove the side panel 39, pins 48 and 52 are withdrawn to free the upper portion of panel 39. Pins 55 and 58 can now be withdrawn to free the lower portion of the panel 39 and the panel can be completely removed. By a similar process, panel 36 can likewise be removed, only releasable pivot pins 63 and 66 being visible in the drawing (see FIGURE 4). With the two side panels 36 and 39 being removed, the opposite panels 35 and 38 are now swung outwardly and around to assume the horizontal position shown in FIGURE 3. In order to do this, it is necessary to release the two knobs 54 and 57 adjacent the lower edge of panel 38. When these knobs are released, panel 38 is free to swing outwardly to assume the position shown in FIGURE 3. Panel 35 is similarly released by withdrawing knob 62 and a corresponding knob on the opposite end of panel 36. When the panels 35 and 38 are swung outwardly and around to a horizontal position shown in FIGURE 3, they are retained in this position by fixed pins 68 and 69 which extend through bars 18 and 20 and project into the path of the side panels 35 and 38 which now act as shelf members. Similar pins 70 and 71 extend through bars 28 and 80 on the opposite end of the cart as best shown in FIGURE 4 to support the opposite ends of the shelves.

With the side panels 36 and 39 removed and with the panels 35 and 38 swung to the horizontal position as shown in FIGURE 3, the laundry cart can readily be unloaded since there is an open space on opposite sides of the cart equivalent to the width of two panels.

After the laundry is unloaded, the side panels 36 and 39 are again secured in position by retracting pivot pins 48 and 52, placing the panels in position and then allowing the pivot pins to assume their normal position. The shelves 36 and 39 can then be swung outwardly and around to the horizontal position shown in FIGURE 4. Again, there are stop pins 72, 73, 74 and 75 which project through bars 18 through 20, 28 and 30, respectively, and serve to limit the downward movement of panels 36 and 39 to cause them to remain in a horizontal position. In FIGURE 5, I have shown pin 75 as projecting beneath panel 39 to maintain it in an upright position. It will be noted that the pin 75 projects a relatively short distance into the cart so as not to seriously impede the removal or withdrawal of laundry from the cart.

Side panels 37 and 40 can now be released at their lower ends. In connection with panel 40, this is done by grasping knobs 56 and 59 to release the pins associated therewith. In connection with side panel 37, this is done by grasping knob 40 and the corresponding knob on the opposite end of panel 37. The panels can now be swung outwardly and around to a horizontal position at which time they will rest on pins 76, 77, 78 and 79 extending through bars 18, 20, 28 and 30 respectively.

It is to be understood that all of the pins 68 through 79 are of the same construction, being readily mounted in their respective bars and projecting into the cart a distance sufficient to retain the side panels 35 through 40 in horizontal position but insufficiently to impede the removal of soiled laundry from the cart, as shown in detail in FIGURE 5 in connection with pin 75.

With the side panels 35 through 40 disposed in the horizontal position shown in FIGURE 4, the cart is now ready to be sterilized for the reception of clean linen. The entire cart may be moved into a sterilizing chamber. After sterilization and after the laundering operation has been completed, the clean linen is then stacked on shelves formed by the base plate 10 and the panels 35 through 40. The entire cart is then covered with a plastic cover, the lower edge of which is detachably fastened to the underside of base plate 10 in any suitable manner.

The cart, along with the clean linen piled thereon, can then be transported and wheeled to the various points at which the linen is to be used. With this arrangement, it is unnecessary to store the linen in a storage facility since the cart can be used for intermediate storage prior to the delivery of the linen to the desired locations. As soon as all the linen has been used, the side panels 35 through 40 can then be again swung to the vertical positions shown in FIGURE 1 and locked in place by withdrawing and then releasing the knobs 54, 55, 56, 57, 58, 59, 62, 63, 64 and the corresponding knobs (not shown) on the opposite sides of panels 35, 36 and 37. The cart is now again available for the reception of soiled laundry and the entire process described above can be repeated.

CONCLUSION

It will be seen that I have provided a novel laundry cart which can be used for both the transporting and storage of soiled and clean laundry. This is accomplished by an extremely simple construction which can be readily sterilized when it is to be utilized with clean laundry.

I claim as my invention:
1. A laundry cart designed for handling of both soiled and clean laundry, said cart comprising:
 a frame mmber of elongated cross section;
 a plurality of side panels;
 means securing each of said side panels to said frame member for pivotal movement of each side panel about an axis close to one longitudinal edge of said panel;
 said securing means being vertically spaced apart by an amount substantially equal to the width of the panels so that when said panels are vertically disposed they collectively form substantially continuous side walls;
 said side panels each being swingable about said axis to a position in which it is horizontally disposed to form a portion of a shelf; any two opposite side panels being of a width such that when said panels are horizontally disposed adjacent each other, their collective width is approximately the width of the cart; and means for releasably retaining each of said side panels in said horizontally disposed position.

2. The laundry cart of claim 1 in which each of said side panels is of a width approximately one-half the width of the cart.

3. The laundry cart of claim 1 in which the pivotal securing means for each side panel is adjacent the upper longitudinal edge of the panel so that when the panel is in a vertical position it tends to be retained in that position by the weight of the panel.

4. The laundry cart of claim 1 in which at least one of said side panels is removable to facilitate the removal of soiled laundry from the cart.

5. The laundry cart of claim 4 in which the side panel which is removable is immediately beneath the top side panel on that side of the cart so that upon said removable side panel being removed and upon the side panel above said removable panel being swung to a horizontal position, a space equal in width to that of two side panels is available for removal of the soiled laundry.

6. The laundry cart of claim 1 in which a pair of opposite side panels is removable to facilitate the removal of said laundry from the cart.

7. The laundry cart of claim 1 in which there are a plurality of releasable retaining means associated with the frame mmber, each of said retaining means being located so as to cooperate with one of said side panels at a point laterally spaced from the securing means to prevent swinging of the side panel while said cart is being used for the reception of soiled laundry.

References Cited

UNITED STATES PATENTS

| | | | |
|---|---|---|---|
| 870,835 | 11/1907 | Loew | 211—150 X |
| 1,427,388 | 8/1922 | Holley | 280—79.3 X |
| 1,518,497 | 12/1924 | Flood et al. | 211—150 X |
| 1,828,331 | 10/1931 | Matthews | 211—150 X |
| 2,652,308 | 9/1953 | Peterson | 312—250 X |
| 2,844,257 | 7/1958 | Friedman | 108—11 X |
| 3,265,404 | 8/1966 | Skufca | 280—79.3 |

JAMES T. McCALL, Primary Examiner

U.S. Cl. X.R.

312—286

Disclaimer 3,498,689.—*Roger L. Hansen*, Minnetonka Village, Minn. LAUNDRY CART. Patent dated Mar. 3, 1970. Disclaimer filed Mar. 15, 1972, by the inventor.

Hereby enters this disclaimer to claims 1, 2 and 3 of said patent.

[*Official Gazette June 27, 1972.*]